United States Patent
Jin et al.

(10) Patent No.: US 9,196,021 B2
(45) Date of Patent: Nov. 24, 2015

(54) VIDEO ENHANCEMENT USING RELATED CONTENT

(71) Applicant: Adobe Systems Incorporated, San Jose, CA (US)

(72) Inventors: Hailin Jin, San Jose, CA (US); Scott David Cohen, Sunnyvale, CA (US); Zhe Lin, Fremont, CA (US)

(*) Notice: Subject to any disclaimer, the term of this patent is extended or adjusted under 35 U.S.C. 154(b) by 206 days.

(21) Appl. No.: 13/904,947

(22) Filed: May 29, 2013

(65) Prior Publication Data

US 2014/0355899 A1 Dec. 4, 2014

(51) Int. Cl.
*G06K 9/40* (2006.01)
*G06T 5/00* (2006.01)

(52) U.S. Cl.
CPC .............. *G06T 5/005* (2013.01); *G06T 5/002* (2013.01); *G06T 2207/10016* (2013.01); *G06T 2207/20072* (2013.01)

(58) Field of Classification Search
None
See application file for complete search history.

(56) References Cited

U.S. PATENT DOCUMENTS

| | | | |
|---|---|---|---|
| 2004/0218834 A1* | 11/2004 | Bishop et al. | 382/299 |
| 2006/0126952 A1* | 6/2006 | Suzuki et al. | 382/233 |
| 2009/0022226 A1* | 1/2009 | Bang et al. | 375/240.16 |
| 2010/0272184 A1* | 10/2010 | Fishbain et al. | 375/240.16 |
| 2012/0328210 A1* | 12/2012 | Fattal et al. | 382/264 |

OTHER PUBLICATIONS

Bhat, Pravin, et al., "Using Photographs to Enhance Videos of a Static Scene", Proceeding: EGSR'07 Proceedings of the 18th Eurographics conference on Rendering Techniques,(2007), 327-338.*
Barnes, Connelly, et al., "PatchMatch: a randomized correspondence algorithm for structural image editing", ACM Trans. Graph., 28(3), (Aug. 2009), 1-11.
Bhat, Pravin, et al., "Using photographs to enhance videos of a static scene", Proceeding: EGSR'07 Proceedings of the 18th Eurographics conference on Rendering Techniques, (2007), 327-338.
Gould, Stephen, et al., "PatchMatchGraph: Building a Graph of Dense Patch Correspondences for Label Transfer", Computer Vision—ECCV 2012, Lecture Notes in Computer Science, vol. 7576, (2012), 439-452.
He, K., et al., "Computing Nearest-Neighbor Fields via Propagation-Assisted KD-Trees", CVPR 2012, (2012), 1-3.
Liu, CE, et al., "A high-quality video denoising algorithm based on reliable motion estimation", Proceeding: ECCV'10 Proceedings of the 11th European conference on computer vision conference on Computer vision: Part III, (2010), 706-719.

* cited by examiner

*Primary Examiner* — Phuoc Tran
(74) *Attorney, Agent, or Firm* — Shook, Hardy & Bacon LLP

(57) ABSTRACT

A method and systems of enhancing a video using a related image are provided. One or more patches are identified in the video, with each patch identifying a region that is present in one of the frames of the video that can be mapped to a similar region in at least one other frame of the video. For each identified patch in the video, a best matching patch in the related image is found. The video is enhanced using the best matching patch in the related image for each identified patch in the video.

18 Claims, 8 Drawing Sheets

VIDEO ENHANCEMENT USING RELATED CONTENT

FIELD

The present disclosure relates generally to enhancement of video using related images.

BACKGROUND

There are a number of different enhancements that would be desirable to be performed on video. Many of these enhancements, however, may be difficult if the video does not have enough information in it to perform the desired enhancement. For example, a video may have a resolution that is lower than desired. However, it can be difficult or impossible to increase the resolution of a low-resolution video when the video does not have enough information to fill in enough pixels to raise the resolution.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
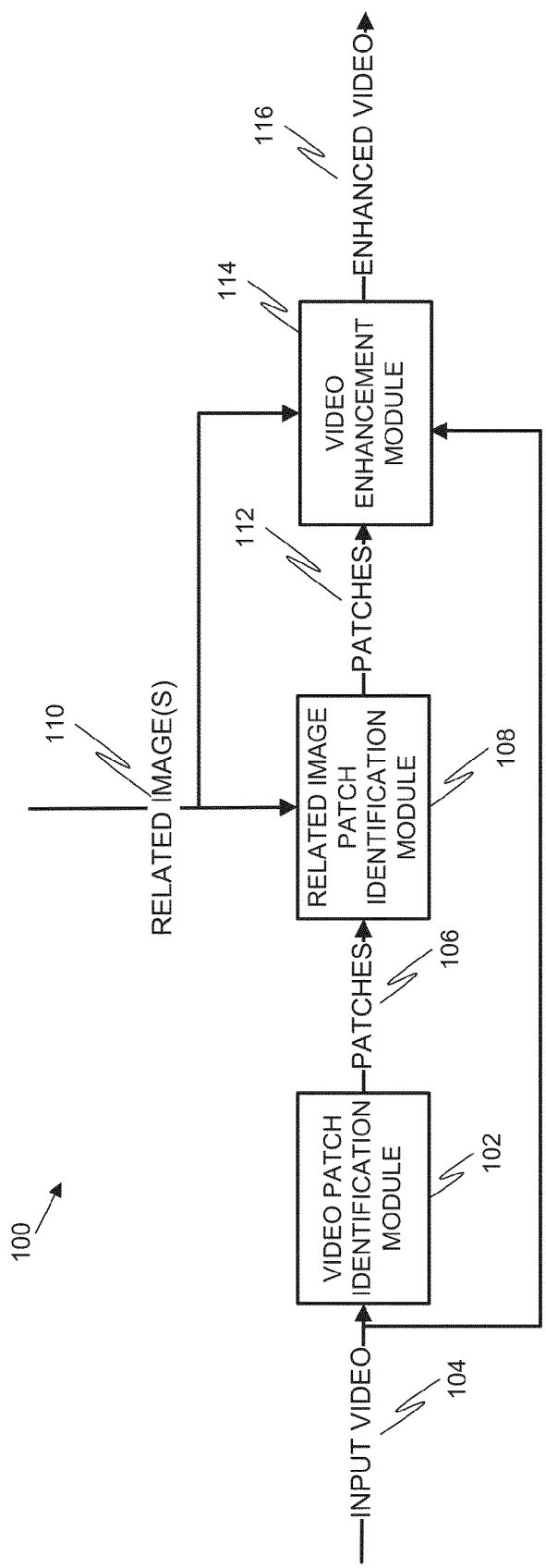
FIG. 1 is block diagram illustrating a system, in accordance with an example embodiment, of enhancing video.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Disclosed herein is a method and system of enhancing video using one or more related images. A related image may be an image having the same or similar scene as a video, but that contains information useful in enhancing the video but that is missing from the video. In an example embodiment, the related image is a still image taken of the same or similar scene as a video, but that is taken at a higher resolution than the video. In another example embodiment, more than one related image, such as a different video, may be used to enhance the video. The related image or images may have been taken by a different camera or lens than the original video.

As an example, a user at a birthday party may record a video of a child blowing out birthday candles. Another user at the same party may take a picture of the blowing out of the birthday candles using a camera having a higher resolution than the video. In an example embodiment, the picture may be used to enhance the resolution of the video.

In an example embodiment, video enhancement can be accomplished by performing patch matching between video from one content source and the content from another content source. The goal of patch matching between content sources is to allow the system to apply information gleaned from the content from one content source to perform one or more video enhancements on the video from a different content source.

For each frame in the original video, local feature matching or patch matching may be performed to identify regions of interest. Various different patch matching techniques may be used for this purpose, and several will be discussed in more detail below. In one example embodiment, one of these disclosed patch matching techniques may be used. However, in other embodiments, a different patch matching process, or even a non-patch matching process, may be used to identify these regions of interest. For purposes of this disclosure, these regions of interest may be referred to as patches, even if not located using what is normally known as a patch matching process.

Once this has been performed, then a particular frame in the video may be examined with respect to the related image or images. The goal here is to locate a region of interest in the related image or images that can be mapped to the patch in the particular frame in the video. As with the patches in the original video, these regions of interest may be identified using the described patch matching techniques, or through a different patch matching or non-patch matching process. The identified region of interest can then be used as a constraint in the video enhancement process.

The identified patches may then be used to perform any number of video enhancement functions on the video, including, for example, denoising, super-resolution, interpolation, deblurring, recoloring, contrast enhancement, compression removal, inpainting, and so forth.

For values of data such as images and/or videos, any of multiple representations or spaces can be used. In some example embodiments, images/videos can be represented as grayscale values, binary values, RGB/Lab/YIQ/YUB or any other color space, gradients, texture filters, wavelets, or any other filter responses, optical flow (for video), surface normal (for shapes), volume occupancy (for shapes), local histogram of quantized gradient orientations, local histogram of texture filters (e.g., textons), and any other image/video/rasterized shape representation or any combination of these, to name just a few examples. In some implementations, gradient domain reconstruction can be used. For example, the gradients and the colors can be reconstructed separately, and standard gradient domain techniques (e.g., solving the constrained Posson equation) can be used to reconstruct the image from its gradients, where the colors are used as a regularization term and/or initialization and/or boundary conditions.

It should also be noted that while the present disclosure discusses aspects in terms of two-dimensional images, similar techniques are used in other example embodiments for 3D shapes/models in, for example, a rasterized presentation. In such example embodiments, patches can be 3D. The search space can be 3D. In some example embodiments, an arbitrary dimensional Euclidean space can be used (e.g., 1D for curves, or 4D for voxel data changing in time). In some example embodiments, an arbitrary dimensional topological space may be used (e.g., a 2D coordinate system defined on the surface of a 3D donut or sphere).

FIG. 1 is block diagram illustrating a system 100, in accordance with an example embodiment, of enhancing video. The system 100 may be implemented on any number of different hardware components. In an example embodiment, the system 100 is implemented on a computer system executed by a processor. In another example embodiment, the system 100 may be executed using a graphics processing unit (GPU).

In some embodiments, the system 100 may reside on a user machine, such as a personal computer (PC), tablet computer, smartphone, and the like. In other embodiments, the system 100 may reside on a centralized server in communication with a user machine. In such embodiments, the user machine may direct the centralized server to perform the patch identification and/or video enhancement. It should be noted that hybrid embodiments are also envisioned, where some aspects of the patch identification and/or video enhancement are performed on a user machine and others are performed on a centralized server. This allows a user machine to offload part or all of the patch identification and/or video enhancement to another machine for faster processing.

The system 100 may include an input video patch identification module 102, which may act to identify patches in an input video 104. A patch may be defined as an image region believed to be mappable in multiple places in an input video or image. A patch may identify, for example, a region that closely resembles another region of the same image. Alternatively, the patch may identify a region that closely resembles another region of a different image in the same video. This patch identification can be performed in a number of different ways, although specific example implementations will be described in more detail below. The output of the patch identification module 102 is one or more identified patches 106 from the input video 104.

The patches 106 may be passed to a related image patch identification module 108, which may attempt to map the patches 106 to one or more patches in the related image(s) 110. The output of the related image patch identification module 108 are related patches 112, which can then be passed to a video enhancement module 114, which may act to enhance the input video 104 based on the related patches 112. The output of the video enhancement module 114 is an enhanced video 116.

Figure 2:
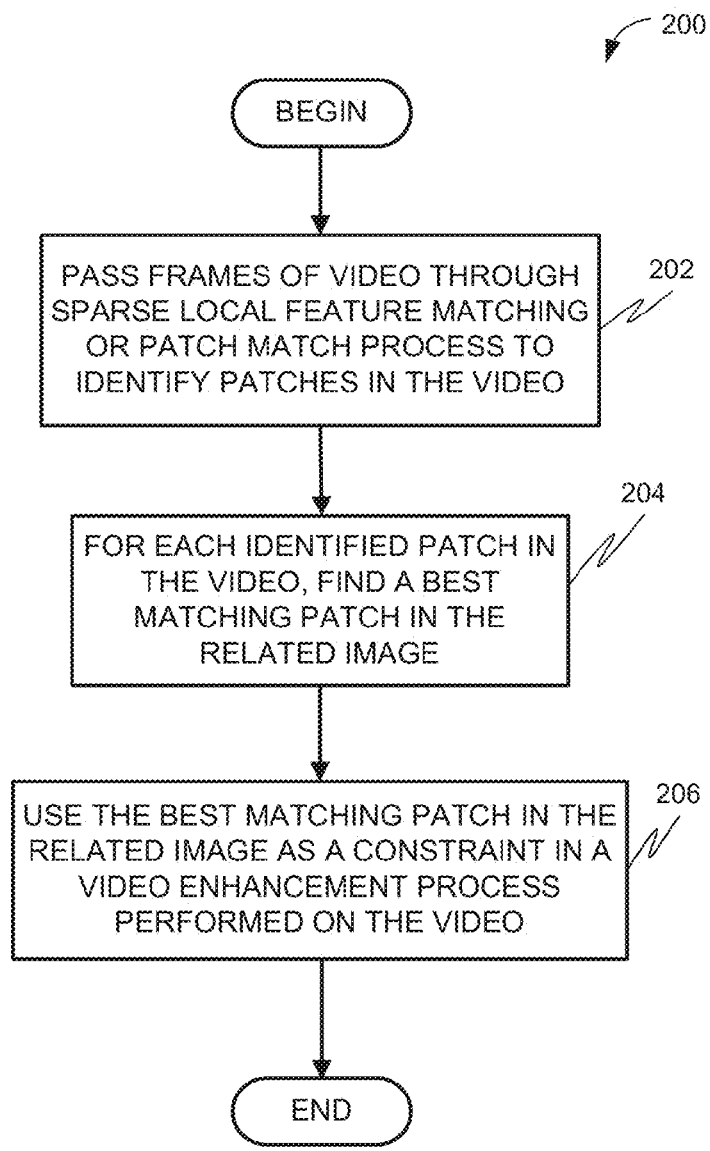
FIG. 2 is a flow diagram illustrating a method, in accordance with an example embodiment, of enhancing a video using a related image.

FIG. 2 is a flow diagram illustrating a method 200, in accordance with an example embodiment, of enhancing a video using a related image. The method 200 may, for example, be deployed on the system 100.

At operation 202, a plurality of frames in a video may be passed through a sparse local feature matching or patch match process to identify patches in the video. This may include, for example, estimation of local affine transformation to guide global or local geometry and appearance rectification later when the related images are analyzed, to help correct for items such as different angles, lighting, and the like, between the original video and the related image.

At operation 204, for each identified patch in the video, a best matching patch may be found in the related image. The related image may be rectified using the information from the patches from the video.

At operation 206, the best matching patch in the related image may be used as a constraint in a video enhancement process performed on the video.

Figure 3:
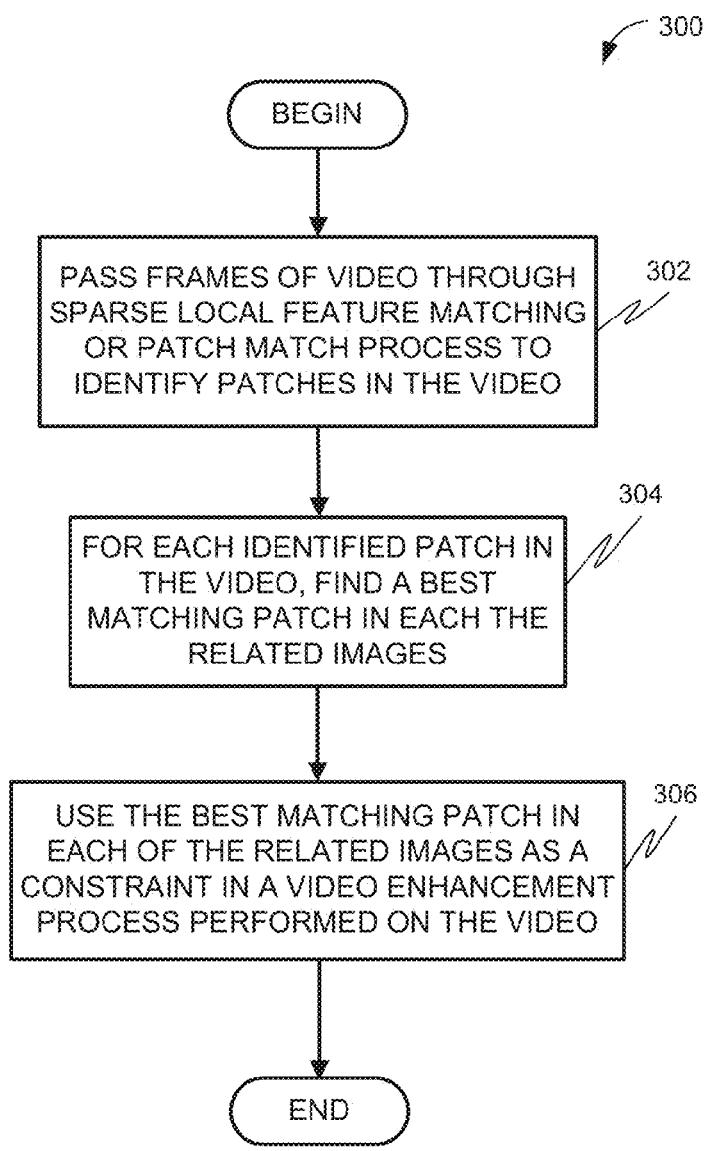
FIG. 3 is a flow diagram illustrating a method, in accordance with an example embodiment, of enhancing a video using a plurality of related images.

FIG. 3 is a flow diagram illustrating a method 300, in accordance with an example embodiment, of enhancing a video using a plurality of related images. The method 300 may, for example, be deployed on the system 100.

At operation 302, a plurality of frames in the video may be passed through a sparse local feature matching or patch match process to identify patches in the video. This may include, for example, estimation of local affine transformation to guide global or local geometry and appearance rectification later when the related images are analyzed, to help correct for items such as different angles, lighting, and the like, between the original video and the related image.

At operation 304, for each identified patch in the video, a best matching patch may be found in each of the related images. The related image may be rectified using the information from the patches from the video.

At operation 306, each identified matching patch in the related images may be used as a constraint in a video enhancement process performed on the video.

As an example, a particular patch p in an input video may be denoised with nearest neighbor patches from the video $p_1, p_2 \ldots p_m$, as well as with nearest neighbor patches from the image(s) $r_1, r_2, \ldots, r_n$. Note that the set of nearest neighbor patches from the video may include more than one patch from a frame, including the frame containing the patch p to be denoised. Some video frames may not contribute any nearest neighbors. For example, the patch p may be occluded in some frames. Similarly, the set of nearest neighbor patches from the related image(s) can contain multiple patches from a single high quality image, and some high quality input images may not contribute any nearest neighbor patches. It is even possible that either m or n or both are zero, meaning that only the video patches or the related image patches are used to denoise.

The equation $s_j = T_j(r_j)$ may denote the transformed version of patch $r_j$ that makes it match p (such as through rectification). $T_j$ may perform both geometric and color transformations on a patch.

In one example embodiment, it may be assumed that the $p_i$ are samples from a normal distribution centered at a true noiseless patch p* with covariance matric $u_i$, and that $s_j$ is a sample from a normal distribution centered at p* with covariance matrix $v_i$. Since the related image is higher quality than the video, the image noise variance can be expected to be less than the video source variance: v<u. The maximum likelihood estimate for the denoised patch p* of p is the solution to the optimization problem:

$$p^* = \arg\min\_p[\text{Sum}\{i=1\ldots m\}\|p-p_i\|^2/(2u)] + [\text{Sum}\{j=1\ldots n\}\|p-s_j\|^2(2v)]$$

This optimization problem has a closed form solution in which p* is a weighted linear combination of low quality video nearest neighbor patches $p_i$ and high quality image nearest neighbor patches $S_j$:

$$p^* = \text{Sum}\{i=1\ldots m\}c_i p_i + \text{Sum}\{j=1\ldots n\}d_j s_j, \text{ where}$$

$$c_i = a_i/W$$

$$d_j = b_j/W$$

$$a_i = 1/(2u)$$

$$b_j = 1/(2v)$$

$$W = \text{Sum}\{i=1\ldots m\}a\_i + \text{Sum}\{j=1\ldots n\}b_j$$

where the weight normalization by W makes all the patch weights sum to 1. For constant variances I and v, the weights $c_i$ and $d_j$ on the video and image neighbors patches simplifies to:

$$c_i = 1/(m+n/\lambda)$$

$$d_j = 1/(m\lambda+n)$$

$$\lambda = v/u$$

Note that the weights ci and di depend only on the ratio $\lambda=v/u$ of the noise variances. Furthermore, the weights di on the high quality image patches are greater than the weights on the low quality image patches because it is expected that V<1. In particular, ci<1/(m+n) and dj>1/(m+n). A user could set the value of V in order to control the strength of the high quality image neighbors versus the strength of the low quality video neighbors in the denoising process.

Other methods for setting the weights or the relative strengths of the nearest neighbor patches in a different combination of patches to produce a denoised patch are possible. For example, the weights may be different for each nearest neighbor patch. The weight $c_i$ for video patch $p_i$ may depend on the patch distance $\|p-p_i\|$, and the weight $d_j$ for the rectified image patch $s_j$ may depend on the patch distance $\|p-s_j\|$, where smaller patch distances result in higher weights. Priori information that high quality image patches are typically more trustworthy than low quality video patches can be used along with patch distances in defining patch weights/importance for denoising the patch p.

As described above, there may be a number of different ways patch matching may be performed, in both the video itself and between the video and the related images. In one example embodiment, a patch matching process that does not take into account temporal consistency between frames may be utilized. Such a process does not require any more than a single frame to be analyzed, and can effectively be used when comparing patches from two frames. In one example embodiment, a nearest neighbor algorithm is utilized along an iterative update process, in which good patch offsets are propagated to adjacent pixels, followed by random searches in the neighborhood of the best offset found so far.

Temporal consistency refers to the degree of consistency of the relative change in position of an object or region between frames over similar periods of time. For example, if an object moves a distance of 10 pixels between a prior frame and a subsequent frame and moves a distance of 10 pixels between the reference frame and a subsequent frame, then there would be a high degree of temporal consistency for the object. If, on the other hand, the object moved a distance of 10 pixels between a prior frame and a reference frame, and 100 pixels between the reference frame and a subsequent frame, then there would be a low degree of temporal consistency for the object.

Figure 4:
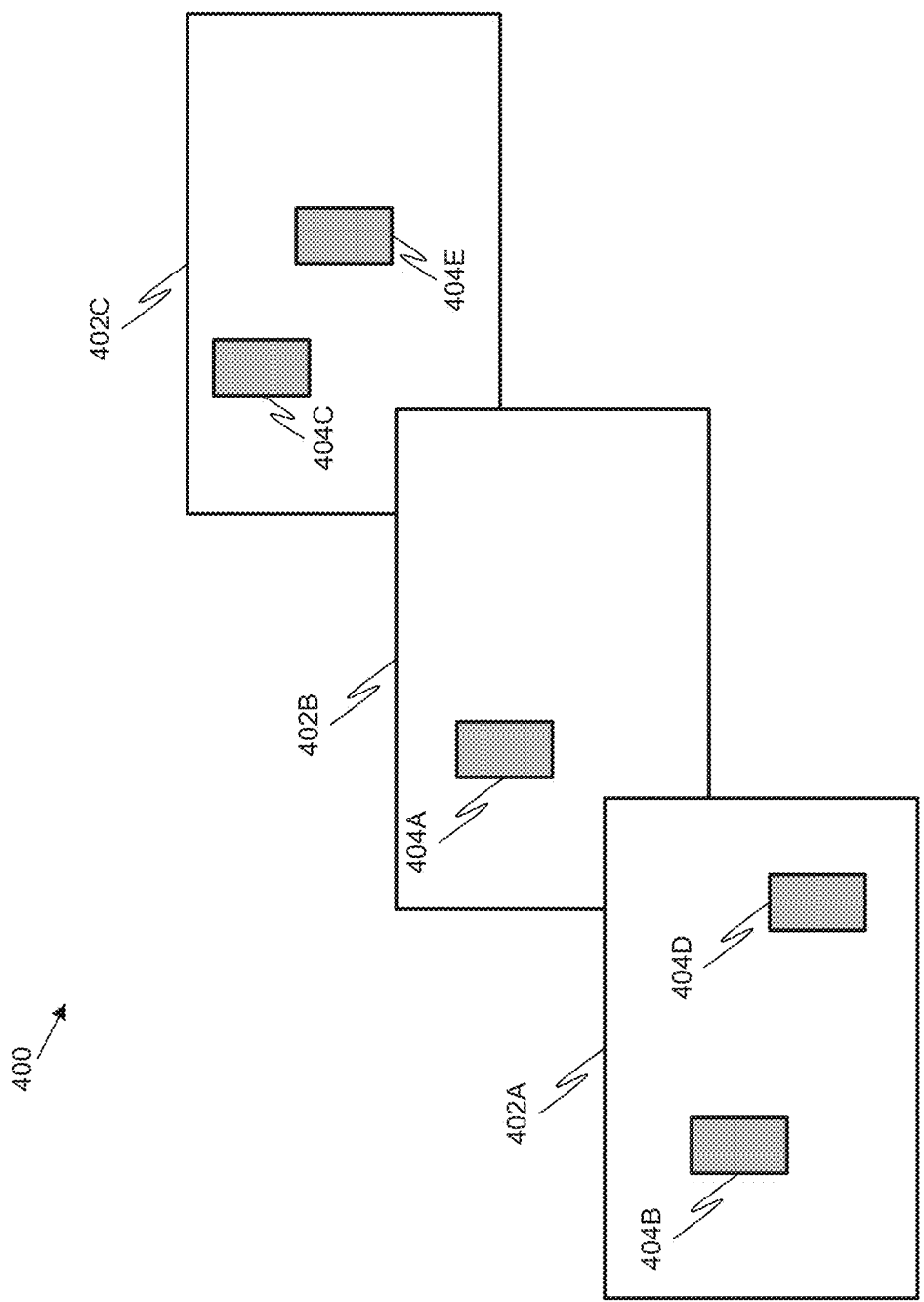
FIG. 4 is a diagram illustrating a method, in accordance with an example embodiment, of identifying patches in three or more images.

When three or more frames are being analyzed, however, it may be beneficial to utilize a patch matching process that takes into account temporal consistency. FIG. 4 is a diagram illustrating a method, in accordance with an example embodiment, of identifying patches in three or more images. The method 400 depicts how three frames 402A, 402B, 402C are analyzed to identify whether a suspected patch, such as suspected patch 404A, can be mapped to other suspected patches 404B, 404C, 404D, 404E in other frames. As described above, the purpose of this method 400 is to ensure that a portion of an image, such as an object, can be mapped through multiple frames, despite the movement of the portion of the image between frames. It should be noted, however, that the frames being referenced need not be adjacent frames in the video (e.g., it is possible that object position Here, suspected patch 404A is being examined, and various suspected patches 404B, 404C, 404D, 404E in the frames 402A, 402B, 402C are found to be substantially similar). Similarity may be rated according to a number of different algorithms based on one or more factors (for example, similar patterns, colors, textures, etc.) A threshold level of the one or more factors may be established, and if this threshold is met then a given region is deemed to be "similar" to a patch, and may be regarded as a "suspected patch."

The various suspected patches 404A, 404B, 404C, 404D, 404E may be analyzed using a nearest neighbor algorithm. In an example embodiment, an algorithm is used that examines all three frames 402A, 402B, 402C in an attempt to find the nearest suspected patches throughout all three frames 402A, 402B, 402C, as well as utilizing a temporal consistency component that factors in the change in positions from frame to frame. This algorithm may be expressed as follows:

$$\arg\min\nolimits_{\{x_l, x_r\}} |I_l(x_l) - I(x)| + |I_r(x_r) - I(x)| + \alpha |I_l(x_l) - I_r(x_r)| + \beta \operatorname{dist}(x_l - x, x_r - x)$$

where x is the location of a patch in image I, $I_l$ and $I_r$ are the images before and after I, respectively, and $\alpha$ and $\beta$ are constants, which may be weights assigned to the calculations in order to alter the importance of closeness in distance between suspected patches in frame 402A and frame 402C (which may be less important than, for example, the closeness in distance between suspected patches between frame 402A and frame 402B, and the closeness in distance between suspected patches in frame 402B and 402C). The weights may also alter the importance of temporal consistency between the suspected patches.

The weights may be either fixed or modifiable. In some example embodiments, the weights may be dynamically modifiable based on the type of the image and the type of video enhancement desired. For example, the weights assigned for a 16-bit color video to perform denoising may be different than assigned for a black and white video to perform inpainting. In some example embodiments, the weights may be altered by the user, allowing the user flexibility in fine-tuning the system. Sliders, for example, may be presented in a user interface allowing the user to easily emphasize or deemphasize portions of the equation.

The equation presented is merely one example embodiment. In other embodiments, other weights may be applied to some, all, or none of the variables and terms in the equation.

In an example embodiment, a may be a number less than 1.

In an example embodiment, this analysis essentially finds, for a given optical path, what is the best matching patch in another image. It does this by finding consistent offsets between patches.

Here, the analysis may find that suspected patches 404A, 404B, and 404C all comprise a single patch, by virtue of the fact that suspected patch 404B and suspected patch 404C both resemble suspected patch 404A and have temporal consistency. This is in contrast to, for example, suspected patch 404E, which, while resembling suspected patch 404A, does not have temporal consistency throughout the three frames 402A, 402B, 402C.

In another example embodiment, a constraint may be added to limit the maximum offset allowed. As an example, the constraint may indicate that if there is movement across more than half of the screen from frame to frame, the suspected patch will not be considered. Likewise, in another example embodiment, a constraint may be added to require a minimum offset. These constraints may be set by the system, a system administrator, or a user.

In the example depicted in FIG. 4, the algorithm would identify patches 404B and 404C as being the nearest neighbors in the neighboring frames 402A, 402C, thus identifying them as matching patches for patch 404A. Likewise, patches 404D and 404E would be found not to be matching patches for patch 404A, due, at least in part, to the fact that the change in position from frame to frame is not consistent.

It should be noted that while the above equation is described in terms of the examination of three frames, the equation can be modified to accommodate more frames, which may result in a more accurate analysis in certain embodiments.

Figure 5:
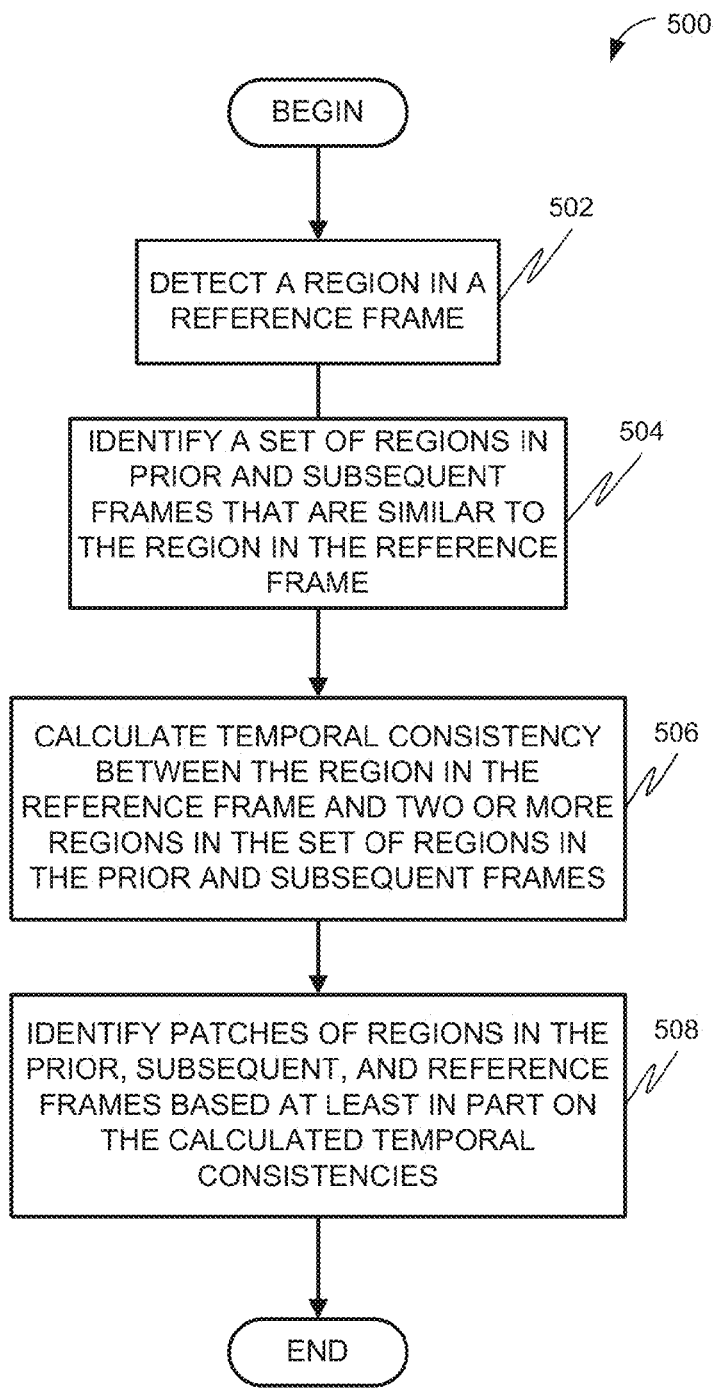
FIG. 5 is a flow diagram illustrating a method, in accordance with an example embodiment, of identifying one or more patches in three or more frames.

FIG. 5 is a flow diagram illustrating a method 500, in accordance with an example embodiment, of identifying one or more patches in three or more frames. The method 500 may, for example, be deployed on the system 100.

Each of the patches represents a region that can be mapped throughout all of the three or more frames. At operation 502, a region is detected in a reference frame. This is a region in the reference frame (e.g., middle frame) that will be attempted to be found in the prior and subsequent frames. At operation 504, a set of regions in a first and third frames that are similar to the region in the second frame are identified. This may include at least one similar region in the first frame and one similar region in the third frame, although there may be any number of potential matches in each of the first and third frames.

At operation 506, temporal consistency between the region in the reference frame and two or more regions in the set of regions in the prior and subsequent frames may be calculated. At operation 508, patches of regions in the prior, reference, and subsequent frames may be identified based at least in part on the calculated temporal consistencies, with each patch identifying a region in the reference frame that can be mapped to a similar region in the prior and subsequent frames.

While FIG. 5 describes a process undertaken to determine whether a given region can be considered a patch with respect to other regions in other frames in the video, it does not specify how the original region to be analyzed is selected, nor does it specify how the regions in the other frames to be compared with the original region are selected. In an example embodiment, the selection of the original region may be specified by a user. For example, a user may use an input device to draw a selection box window around a particular region. The selection of which regions in the other frames to compare with this selected region may be random (e.g., the system may try multiple different random regions to find the ones that most closely resemble the selected region).

In another example embodiment, the selection of the original region may be random. For example, the system may simply analyze a number of different random regions against random regions in other frames.

In another example embodiment, KD-trees are used to aid in the selection of regions to analyze. In this embodiment, two KD-trees are built, for a prior frame and a subsequent frame, respectively, and an additional propagation cue using the temporal consistency is added in order to search the two trees jointly. As such, a number of candidates can be collected via this search. After all the candidates are collected, additional constraints could be enforced.

A KD-tree is a data structure used for efficient approximate nearest-neighbor field computation. Candidate patches are stored in a KD-tree, and each query can result in checking a leaf. A propagation-assisted KD-tree is a KD-tree where, during the query checking, an extra leaf propagated from nearby queries may also be checked. By reducing the number of candidates to check for each query, a propagation-assisted KD-tree performs queries quickly and efficiently.

A typical KD-tree is a binary tree where each node denotes a subset of the candidate data with a portioning boundary of data space. The partitioning is adaptive to the distribution of the data. Given a query, the search methods descend the tree to a leaf and backtrack other leaves that are close to the query. A propagation-assisted KD-tree eliminates the need for backtracking using the propagated leaves.

There may be a variety of ways to build a KD-tree. In one example embodiment, a p-by-p patch in a color image can be represented by a vector in a $3p^2$-dimensional space. The similarity between two patches is described by the $L_2$ distance in this space. A Walsh-Hadamard Transform may be used as the basis for the projection of each patch. It is a Fourier-like orthogonal transform.

Figure 6:
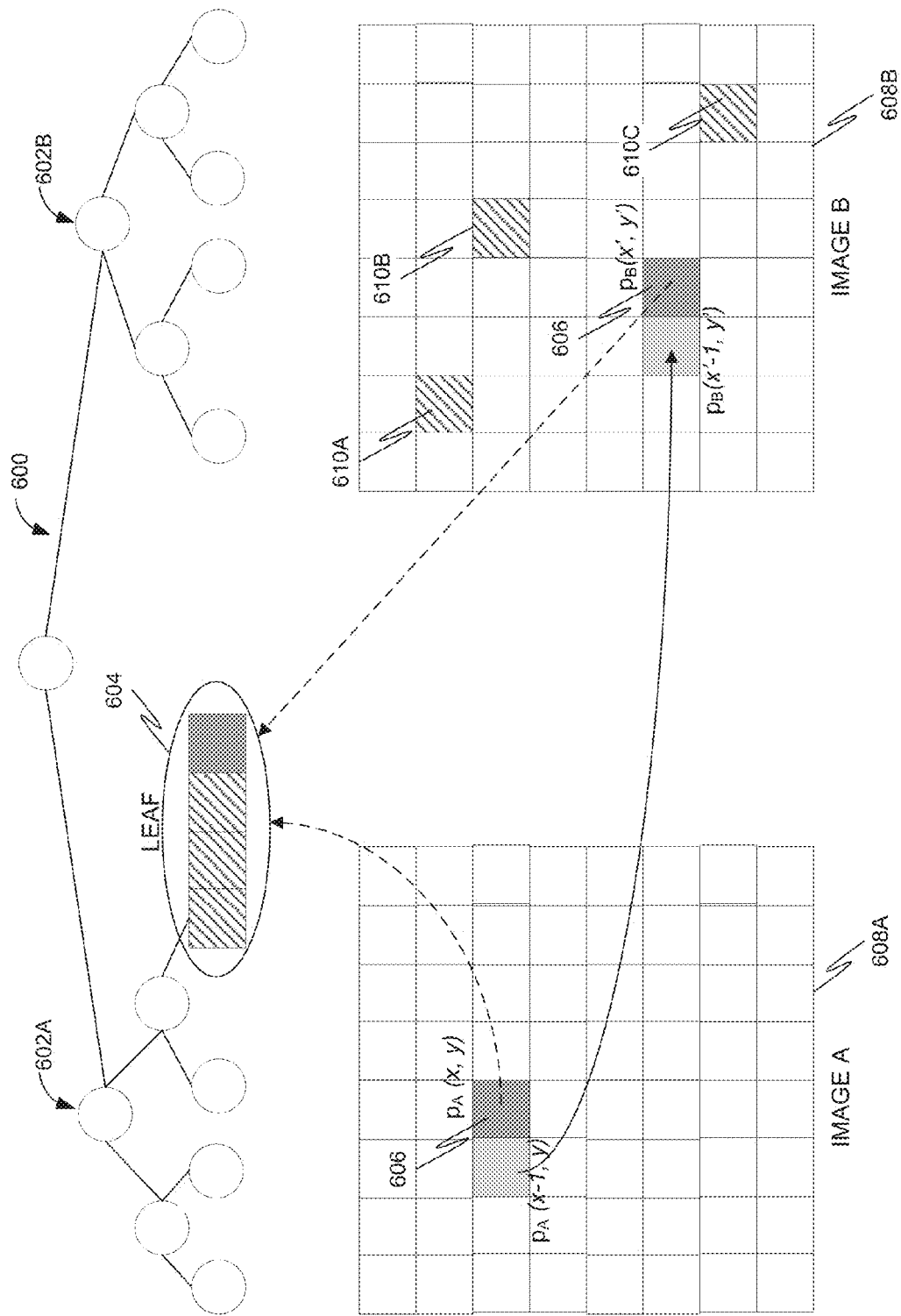
FIG. 6 is a diagram illustrating a K-dimensional (KD)-tree, in accordance with an example embodiment.

After computing the Walsh-Hadamard Transform, a traditional KD-tree may be built. Given any candidate set, the dimension with a maximum spread may be selected, and the space may be split by the median value of the candidate data in this dimension. The candidate set is divided recursively until each terminal node (leaf) contains at most m candidates. A propagation-assisted KD-tree can be created using this same method. A search strategy for a propagation-assisted KD-tree is different than in a normal KD-tree. Specifically, this search strategy involves descending the tree to the appropriate leaf, propagating a leaf from the left (in the image) and a leaf from above (in the image), and then finding the nearest neighbor of all the candidate patches in these leaves. FIG. 6 is a diagram illustrating a KD-tree 600, in accordance with an example embodiment. The KD-tree includes a plurality of nodes, including, for example, nodes 602A and nodes 602B. Also included is at least one leaf, such as leaf 604. Region 606 in image A 608A is also present in image B 608B and represented as a propagated region in leaf 604. The candidates for this patch may also include regions 610A, 610B, and 610C.

In an example embodiment, for a given patch candidate in a given frame of a video, a propagation-assisted KD-tree is constructed for a preceding frame, and a propagation-assisted KD-tree is constructed for a subsequent frame. The propagation-assisted KD-tree search algorithm described above may then be performed on each of these two trees, and all of the candidates in either of these two trees will be considered patch candidates. These patch candidates can then be narrowed by applying the equation described above to eliminate candidates having a lack of temporal consistency (e.g., movement is inconsistent from frame to frame).

Figure 7:
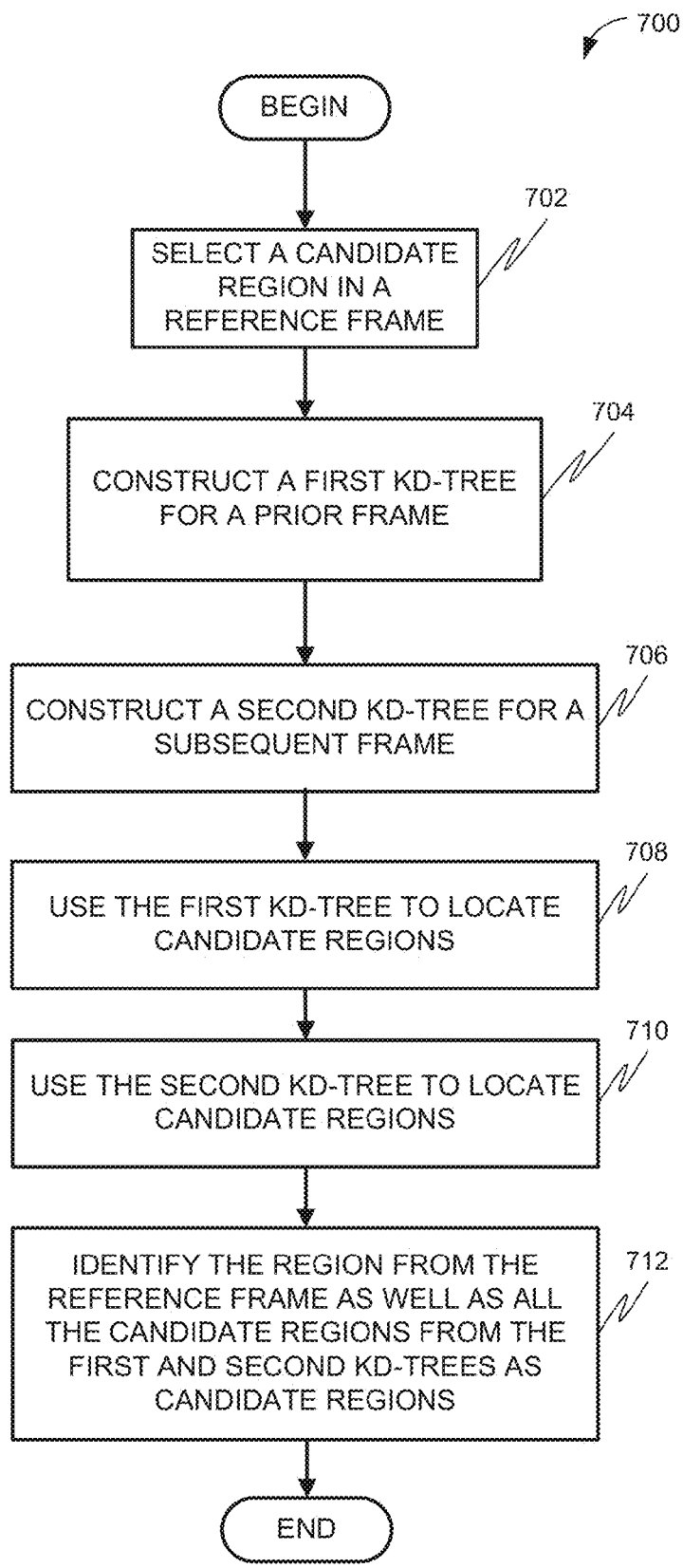
FIG. 7 is a flow diagram illustrating a method, in accordance with an example embodiment, of identifying candidate regions in three frames.

FIG. 7 is a flow diagram illustrating a method 700, in accordance with an example embodiment, of identifying candidate regions in three frames. At operation 702, a candidate region in a reference frame is selected. As described above, this may selected, for example, randomly, or by a user. At operation 704, a first KD-tree is constructed for a prior frame. At operation 706, a second KD-tree is constructed for a subsequent frame. At operation 708, the first KD-tree is searched to locate candidate regions. At operation 710, the second KD-tree is searched to locate candidate regions. At operation 712, the region from the reference frame, as well as the candidate regions from the first and second KD-trees, are identified as candidate regions.

As described above, the video enhancement process may be one of many different types of video enhancement processes. In one example embodiment, the video enhancement process is video denoising using optical flow.

Figure 8:
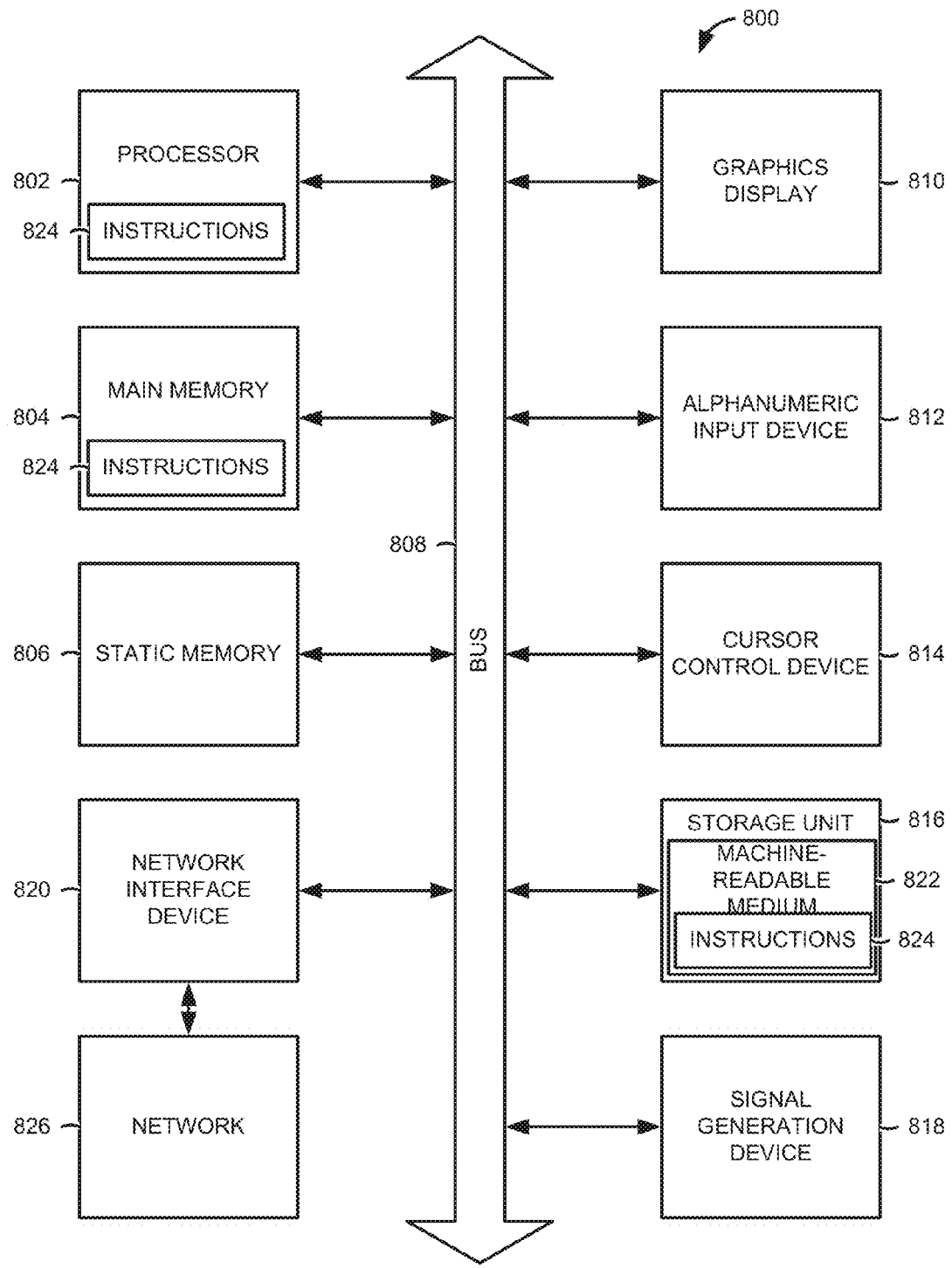
FIG. 8 is a block diagram of a computer processing system at a server system, within which a set of instructions may be executed for causing the computer to perform any one or more of the methodologies discussed herein.

FIG. 8 is a block diagram of a computer processing system 800 at a server system, within which a set of instructions may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a PC, a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 800 includes processor 802 (e.g., a central processing unit (CPU), a GPU or both), main memory 804, and static memory 806, which communicate with each other via bus 808. The processing system 800 may further include graphics display unit 810 (e.g., a plasma display, a liquid crystal display (LCD) or a cathode ray tube (CRT)). The processing system 800 also includes alphanumeric input device 812 (e.g., a keyboard), a cursor control device 814 (e.g., a mouse, touch screen, or the like), a storage unit 816, a signal generation device 818 (e.g., a speaker), and a network interface device 820.

The storage unit 816 includes machine-readable medium 822 on which is stored one or more sets of instructions 824 and data structures (e.g., software) embodying or utilized by any one or more of the methodologies or functions described herein. The instructions 824 may also reside, completely or at least partially, within the main memory 804 and/or within the processor 802 during execution thereof by the processing system 800, the main memory 804 and the processor 802 also constituting machine-readable, tangible media.

The instructions 824 may further be transmitted or received over network 826 via a network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A computerized method of enhancing a video using a related image, the method comprising:
    identifying one or more patches in the video, each patch identifying a region that is present in the video that can be mapped to a similar region in at least one other frame of the video;
    for each identified patch in the video, finding a best matching patch in the related image; and
    enhancing the video using the best matching patch in the related image for each identified patch in the video,
    wherein the related image is rectified using information obtained during the identification of the one or more patches in the video, the rectification including correcting for a different camera angle between the video and the related image.

2. The computerized method of claim 1, wherein the rectification includes correcting for different lighting between the video and the related image.

3. The computerized method of claim 1, wherein the related image has a higher resolution than the video and the enhancing the video includes improving resolution of the video.

4. The computerized method of claim 1, wherein the enhancing the video includes denoising the video based on the related image.

5. The computerized method of claim 1, wherein the enhancing the video includes deblurring at least a portion of the video based on the image.

6. The computerized method of claim 1, wherein the enhancing the video includes recoloring at least a portion of the video based on the image.

7. The computerized method of claim 6, wherein the enhancing the video includes enhancing contrast of the video based on the related image.

8. The computerized method of claim 1, wherein the enhancing the video includes at least partially reducing compression in the video based on the related image.

9. The computerized method of claim 1, wherein the enhancing the video includes inpainting the video based on the related image.

10. The computerized method of claim 1, wherein the identifying one or more patches in the video includes:
    detecting a region in a reference frame of the video;
    identifying a set of regions in a prior and subsequent frame of the video that are similar to the region in the reference frame;

calculating temporal consistency between the region in the reference frame and two or more regions in the set of regions in the prior and subsequent frames; and identifying patches of regions in the prior, reference, and subsequent frames based at least in part on the calculated temporal consistencies, each patch identifying a region in the reference frame that can be mapped to a similar region in the prior and subsequent frames.

11. The computerized method of claim 10, wherein the calculating temporal consistency includes calculating an amount and direction of movement between the region in the reference frame and a region in the prior frame, and comparing it to an amount and direction of movement between the region in the reference frame and a region in the subsequent frame.

12. The computerized method of claim 10, wherein the identifying a set of regions includes identifying a set of regions in the prior and subsequent frames and in another frame that are similar to the region in the reference frame, wherein the calculating temporal consistency further includes calculating temporal consistency between the region in the reference frame and three or more regions in the set of regions, wherein the identifying patches of regions includes identifying patches of regions in the prior, reference, subsequent, and another frames.

13. The computerized method of claim 10, wherein there are at least two location vectors indicating an amount and direction of movement of a region between frames.

14. The computerized method of claim 10, wherein the identifying includes applying a weight to a location vector identifying the amount and direction of movement of a region between the prior frame and the subsequent frame.

15. An apparatus comprising:
a at least one processor;
a memory including instructions;
a video patch identification module implemented by the at least one processor executing the instructions, the video patch identification module configured to identify one or more patches in a video, each patch identifying a region that is present in one of a plurality of frames of the video that can be mapped to a similar region in at least one other frame of the video;
a related image patch identification module configured to, for each identified patch in the video, find a best matching patch in each of one or more related images and rectify the image using information obtained during the identification of the one or more patches in the video, the rectification including correcting for a different camera angle between the video and the related image; and
a video enhancement module configured to enhance the video using the best matching patch in each of the one or more related images for each identified patch in the video.

16. The apparatus of claim 15, wherein the enhancing includes improving resolution of the video.

17. A non-transitory machine-readable storage medium comprising a set of instructions which, when executed by a processor, causes execution of operations comprising:
identifying one or more patches in a video, each patch identifying a region that is present in one of a plurality of frames of the video that can be mapped to a similar region in at least one other frame of the video;
for each identified patch in the video, finding a best matching patch in a related image; and
enhancing the video using the best matching patch in the related image for each identified patch in the video,
wherein the related image is rectified using information obtained during the identification of the one or more patches in the video, the rectification including correcting for a different camera angle between the video and the related image.

18. The non-transitory machine-readable storage medium of claim 17, wherein the identifying one or more patches in the video includes:
detecting a region in a reference frame of the video;
identifying a set of regions in a prior and subsequent frame of the video that are similar to the region in the reference frame;
calculating temporal consistency between the region in the reference frame and two or more regions in the set of regions in the prior and subsequent frames; and
identifying patches of regions in the prior, reference, and subsequent frames based at least in part on the calculated temporal consistencies, each patch identifying a region in the reference frame that can be mapped to a similar region in the prior and subsequent frames.

* * * * *